(12) United States Patent
Wu

(10) Patent No.: US 9,386,619 B2
(45) Date of Patent: *Jul. 5, 2016

(54) METHOD OF HANDLING A CELL ADDITION FOR DUAL CONNECTIVITY AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/267,937

(22) Filed: May 2, 2014

(65) Prior Publication Data

US 2014/0241281 A1 Aug. 28, 2014

Related U.S. Application Data

(63) Continuation-in-part of application No. 14/187,325, filed on Feb. 24, 2014.

(60) Provisional application No. 61/818,883, filed on May 2, 2013, provisional application No. 61/863,914, filed on Aug. 9, 2013, provisional application No. 61/768,363, filed on Feb. 22, 2013.

(51) Int. Cl.
*H04W 76/02* (2009.01)
*H04W 84/04* (2009.01)
(Continued)

(52) U.S. Cl.
CPC ............ *H04W 76/025* (2013.01); *H04L 5/0035* (2013.01); *H04W 74/0833* (2013.01); *H04W 84/045* (2013.01)

(58) Field of Classification Search
CPC ...... H04W 88/02; H04W 12/12; H04W 12/08; H04W 36/12; H04W 36/04; H04W 16/32; H04W 36/08; H04W 76/025; H04W 84/045; H04W 74/0833; H04B 7/2606; H04L 5/0035
USPC ........................................ 455/410, 444, 552.1
See application file for complete search history.

(56) References Cited

U.S. PATENT DOCUMENTS 8,295,165 B2    10/2012  Jung
8,948,768 B2 *   2/2015  Bienas .............. H04W 72/0426
                                                                455/444

(Continued)

FOREIGN PATENT DOCUMENTS

EP    2448325 A1    5/2012
TW    I337030      2/2011

(Continued)

OTHER PUBLICATIONS

3GPP TS 36.331 V11.2.0 (Dec. 2012) 3GPP; Technical Specification Group Access Network; Eveolved Universal Terrestial Radio Access (E-UTRA); Radio Resource (RRC); Protocaol Spsecification (Release 11).*

(Continued)

*Primary Examiner* — Sharad Rampuria
(74) *Attorney, Agent, or Firm* — Winston Hsu; Scott Margo

(57) ABSTRACT

A method of handling a cell addition for dual connectivity in a communication system comprising a communication device, a first base station and a second base station, the communication device being connected to the first base station is disclosed. The method is utilized in the first base station and comprises transmitting a request message to the second base station, for requesting a cell addition for the communication device; receiving a response message comprising system information of a cell of the second base station from the second base station in response to the request message; and transmitting a first radio resource control (RRC) message comprising the system information to the communication device, after receiving the response message.

18 Claims, 4 Drawing Sheets

(51) Int. Cl.
*H04L 5/00* (2006.01)
*H04W 74/08* (2009.01)

(56) References Cited

U.S. PATENT DOCUMENTS

| | | | |
|---|---|---|---|
| 2004/0213279 A1 | 10/2004 | Kusaki | |
| 2006/0233376 A1 | 10/2006 | Forsberg | |
| 2008/0188200 A1 | 8/2008 | Forsberg | |
| 2010/0054472 A1 | 3/2010 | Barany | |
| 2010/0191971 A1 | 7/2010 | Bajic | |
| 2010/0329211 A1 | 12/2010 | Ou | |
| 2011/0122843 A1 | 5/2011 | Iwamura | |
| 2012/0106510 A1 | 5/2012 | Kuo | |
| 2012/0142354 A1* | 6/2012 | Ahluwalia | H04W 36/0072 455/436 |
| 2012/0149419 A1 | 6/2012 | Roh | |
| 2012/0236707 A1 | 9/2012 | Larsson | |
| 2012/0281548 A1 | 11/2012 | Lin | |
| 2013/0039339 A1 | 2/2013 | Rayavarapu | |
| 2013/0053048 A1 | 2/2013 | Garcia | |
| 2013/0244678 A1* | 9/2013 | Damnjanovic | H04W 72/1289 455/452.1 |
| 2014/0092866 A1* | 4/2014 | Teyeb | H04W 76/045 370/331 |
| 2014/0241317 A1* | 8/2014 | Jamadagni | H04W 76/025 370/331 |
| 2014/0286243 A1 | 9/2014 | Yamada | |
| 2014/0307872 A1 | 10/2014 | Heo | |
| 2014/0308921 A1 | 10/2014 | Zhang | |
| 2014/0337935 A1 | 11/2014 | Liu | |
| 2015/0043490 A1* | 2/2015 | Wu | H04W 8/26 370/329 |
| 2015/0043492 A1* | 2/2015 | Baek | H04W 56/0005 370/329 |
| 2016/0037405 A1* | 2/2016 | Choi | H04W 16/32 455/444 |

FOREIGN PATENT DOCUMENTS

| | | |
|---|---|---|
| TW | I351234 | 10/2011 |
| TW | I357270 | 1/2012 |
| WO | 2011100492 A1 | 8/2011 |
| WO | 2012092736 A1 | 7/2012 |
| WO | 2012168996 A1 | 12/2012 |
| WO | 2013116976 A1 | 8/2013 |
| WO | 2014109606 A1 | 7/2014 |
| WO | 2014147929 A1 | 9/2014 |

OTHER PUBLICATIONS

3GPP TSG-RAN WG2 Meeting #81bis R2-131260 Chicago, USA, Apr. 15-19, 2013 in view of 3rd Generation Partnership Project; Technical Specification Group Radio Access Network; Evolved Universal Terrestrial Radio Access (E-UTRA); Radio Resource Control (RRC); Protocol specification (Release 11).*
3GPP TR 36.932 V12.0.0 (Dec. 2012), 3rd Generation Partnership Project; Technical Specification Group Radio Access Network; Scenarios and Requirements for Small Cell Enhancements for E-UTRA and E-UTRAN (Release 12).
3GPP TS 36.331 V11.2.0 (Dec. 2012), 3rd Generation Partnership Project; Technical Specification Group Radio Access Network; Evolved Universal Terrestrial Radio Access (E-UTRA); Radio Resource Control (RRC); Protocol specification (Release 11).
3GPP TSG-RAN WG2 #81 Tdoc R2-130324, Agenda Item: 7.2, Source: NTT Docomo, Inc., Title: Discussion on U-plane architecture for dual connectivity, Document for: Discussion, Decision, Jan. 2013.
3GPP TSG-RAN WG2 #81 Tdoc R2-130420, Agenda Item: 7.2, Source: Ericsson, ST-Ericsson, Title: Protocol architecture alternatives for dual connectivity, Document for: Discussion, Decision, Jan. 2013.
3GPP TSG-RAN2# 81 R2-130488, Source: NTT Docomo, Inc., Title: Necessity of C-plane architecture enhancements for dual connectivity, Document for: Discussion, Agenda Item: 7.2, Jan. 2013.

European Search report issued on Oct. 8, 2014 for EP application No. 14020017.1, filing date Feb. 24, 2014.
Office action mailed on Oct. 17, 2014 for the European application No. 14020017.1, filing date Feb. 24, 2014, p. 1-20.
Catt, "Evaluation on the mobility enhancement", 3GPP TSG RAN WG2 Meeting#81, R2-130116, Jan. 28-Feb. 1, 2013, St. Julian's, Malta, XP050668013, pp. 1-3.
Huawei, HiSilicon, "Analysis of inter-node signalling load for mobility mechanism in small cell deployment", 3GPP TSG-RAN WG2 Meeting#81, R2-130228, Jan. 28-Feb. 1, 2013, St. Julian's, Malta, XP050668295, pp. 1-5.
Huawei, HiSilicon, "Feasible scenarios and benefits of dual connectivity in small cell deployment", 3GPP TSG-RAN WG2 Meeting#81, R2-130225, Jan. 28-Feb. 1, 2013, St. Julian's, Malta, XP050668294, pp. 1-9.
Samsung, "Preliminary discussion on inter-ENB Carrier Aggregation", 3GPP TSG-RAN WG2 Meeting#81, R2-130099, Jan. 28-Feb. 1, 2013, St. Julian's, Malta, XP050668002, pp. 1-5.
NTT Docomo, Inc., "Necessity of C-plane architecture enhancements for dual connectivity", 3GPP TSG-RAN2#81, R2-130488, Jan. 28-Feb. 1, 2013, St. Julian's, Malta, XP050668107, pp. 1-4.
European patent application No. 14020057.7, European Search Report mailing date:Jul. 2, 2014.
Office action mailed on Jul. 11, 2014 for the European application No. 14020057.7, p. 1-9.
Huawei, HiSilicon, "Analysis of inter-node signalling load for mobility mechanism in small cell deployment", 3GPP TSG-RAN WG2 Meeting #81bis, R2-131260, Apr. 15-19, 2013, Chicago, USA, XP050699466, pp. 1-4.
Samsung, "Discussion on inter-ENB Carrier Aggregation", 3GPP TSG-RAN WG2 Meeting #81bis, R2-131069, Apr. 15 to 19, 2013, Chicago, US, XP050699237, pp. 1-5.
3GPP TR 36.842 V12.0.0 (Dec. 2013), "3rd Generation Partnership Project; Technical Specification Group Radio Access Network; Study on Small Cell enhancements for E-UTRA and E-UTRAN; Higher layer aspects (Release 12)", XP050752647, pp. 1-71.
European Search report issued on Jan. 26, 2015 for EP application No. 14180472.4, filing date Aug. 11, 2014.
Huawei, HiSilicon, "Study of Solutions and Radio Rrotocol Architecture for Dual-Connectivity", 3GPP TSG-RAN WG2 Meeting#81bis, R2-131164, Apr. 15-19, 2013, Chicago, USA, XP050699432, pp. 1-12.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050712084, pp. 1-209.
Huawei, HiSilicon, "Analysis of inter-node signalling load for mobility mechanism in small cell deployment", 3GPP TSG-RAN WG2 Meeting#81bis, R2-131260, Apr. 15-19, 2013, Chicago, USA, XP050699466, pp. 1-4.
Pantech, "Analysis of the RLF in dual connectivity", 3GPP TSG-RAN WG2 Meeting#81bis, R2-131100, Apr. 15-19, 2013, Chicago, USA, XP050699421, pp. 1-5.
Intel Corporation, "Radio link failure handling for dual connectivity", 3GPP TSG RAN WG2 Meeting#82, R2-131990, May 20-25, 2013, Fukuoka, Japan, XP050700115, pp. 1-4.
3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", XP050712004, pp. 1-57.
Sharp, "PCell vs. SCell with PUCCH for inter-eNB CA", 3GPP TSG-RAN WG2#82, R2-132052, May 20-24, 2013, Fukuoka, Japan, XP050700141, pp. 1-6.
3GPP TR 37.803 V11.2.0 (Jun. 2013), "3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11)", XP050711892, pp. 1-116.
Office Action mailed on Feb. 3, 2015 for the Japanese Application No. 2014-033382, filing date Feb. 24, 2014, pp. 1-3.

(56) References Cited

OTHER PUBLICATIONS

Office action mailed on Aug. 13, 2015 for the U.S. Appl. No. 14/187,325, filed Feb. 24, 2014, p. 1-33.
ETSI TS 136 300 V11.4.0 (Feb. 2013), LTE; Evolved Universal Terrestrial Radio Access (E-Utra) and Evolved Universal Terrestrial Radio Access Network (E-UTRAN); Overall description; stage2; (3GPP TS 36.300 version 11.4.0 Release 11).
ETSI TS 136 331 V11.1.0 (Nov. 2012), LTE; Evolved Universal Terrestrial Radio Access (E-UTRA); Radio Resource Control (RRC); Protocol specification; (3GPP TS 36.331 version 11.1.0 Release 11).
Office action mailed on Sep. 10, 2015 for the European application No. 14180472.4, pp. 1-7.
Office action mailed on Dec. 10, 2015 for the Taiwan application No. 103127521, filing date Aug. 11, 2014, p. 1-8.
Broadcom Corporation, Mobility for dual connectivity, 3GPP TSG RAN WG2 Meeting #81bis, Chicago, USA, Apr. 15-19, 2013, R2-130990.
Office action mailed on Feb. 23, 2016 for the U.S. Appl. No. 14/455,952, filed Aug. 11, 2014, p. 1-50.
European Search report issued on Jan. 29, 2016 for EP application No. 15186869.2.
Catt, "Evaluation on the mobility enhancement", 3GPP TSG RAN WG2 Meeting #81, R2-130116, Jan. 28-Feb. 1, 2013, St. Julian's, Malta, XP050668013, pp. 1-3.
3GPP TS 36.300 V11.4.0 (Dec. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050691592, pp. 1-208.
3GPP TS 36.423 V11.3.0 (Dec. 2012), "3rd Generation Partnership Project; Technical Specification Group Radio Access Network; Evolved Universal Terrestrial Radio Access Network (E-UTRAN); X2 application protocol (X2AP) (Release 11)", XP050691148, pp. 1-141.
3GPP TS 36.331 V11.2.0 (Dec. 2012), "3rd Generation Partnership Project; Technical Specification Group Radio Access Network; Evolved Universal Terrestrial Radio Access (E-UTRA); Radio Resource Control (RRC); Protocol specification (Release 11)", XP050691590, pp. 1-340.
3GPP TS 33.401 V12.6.0 (Dec. 2012), "3rd Generation Partnership Project; Technical Specification Group Services and System Aspects; 3GPP System Architecture Evolution (SAE); Security architecture (Release 12)", XP050691417, pp. 1-121.
Huawei, HiSilicon, "Analysis of inter-node signalling load for mobility mechanism in small cell deployment", 3GPP TSG-RAN WG2 Meeting #81, R2-130228, Jan. 28-Feb. 1, 2013, St. Julian's, Malta, XP050668295, pp. 1-5.
Huawei, HiSilicon, "Feasible scenarios and benefits of dual connectivity in small cell deployment", 3GPP TSG-RAN WG2 Meeting #81, R2-130225, Jan. 28-Feb. 1, 2013, St. Julian's, Malta, XP050668294, pp. 1-9.
NTT Docomo, Inc., "Necessity of C-plane architecture enhancements for dual connectivity", 3GPP TSG-RAN2# 81, R2-130488, Jan. 28-Feb. 1, 2013, St. Julian's, Malta, XP050668107, pp. 1-4.
ETSI TS 136 300 V11.4.0 (Feb. 2013), LTE; Evolved Universal Terrestrial Radio Access (E-UTRA), and Evolved Universal Terrestrial, Radio Access Network (E-UTRAN); Overall description; Stage 2 (3GPP TS 36.300 version 11.4.0 Release 11).
Notice of Allowance mailed on Feb. 4, 2016 for the U.S. Appl. No. 14/187,325, filed Feb. 24, 2014, p. 1-14.

* cited by examiner

METHOD OF HANDLING A CELL ADDITION FOR DUAL CONNECTIVITY AND RELATED COMMUNICATION DEVICE

CROSS REFERENCE TO RELATED APPLICATIONS

This application is a continuation in part of U.S. application Ser. No. 14/187,325 filed on Feb. 24, 2014, which claims the benefit of U.S. Provisional Application No. 61/768,363, filed on Feb. 22, 2013. This application further claims the benefit of U.S. Provisional Application No. 61/818,883, filed on May 2, 2013 and the benefit of U.S. Provisional Application No. 61/863,914, filed on Aug. 9, 2013.

BACKGROUND OF THE INVENTION

1. Field of the Invention

The present invention relates to a method used in a wireless communication system and related communication device, and more particularly, to a method of handling a cell addition for dual connectivity and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Small cells controlled by low-power base stations (e.g., low power NBs/eNBs) are considered to solve fast-growing mobile traffic. The small cells can be deployed in hot spots for both indoor and outdoor scenarios. A low-power base station generally means a base station with a transmission power lower than that of a macro cell base station (e.g., normal NB/eNB). For example, a pico cell base station and a femto cell base station are usually considered as low-power base stations. A UE may simultaneously communicate with a macro cell base station and a low-power base station, to realize dual connectivity. In this situation, the UE can perform transmissions and/or receptions (e.g., of data, packets, messages and/or control information) via both the macro cell base station and the low-power base station. The data throughput increases due to simultaneous data transmissions from/to the macro base station, when the dual connectivity is operated. However, it is unknown how to configure a cell of the low-power base station to the UE to enable the dual connectivity, i.e., adding a cell of the low-power base station while the UE has connected to the macro cell base station. In addition, it is also unknown how to assign a cell radio network temporary identifier (C-RNTI) of the cell of the low-power base station to the UE when realizing the dual connectivity.

Thus, how to add the cell to enable the dual connectivity and to assign the C-RNTI are important problems to be solved.

SUMMARY OF THE INVENTION

The present invention therefore provides a method and related communication device for handling a cell addition for dual connectivity to solve the abovementioned problem.

A method of handling a cell addition for dual connectivity in a communication system comprising a communication device, a first base station and a second base station, the communication device being connected to the first base station is disclosed. The method is utilized in the first base station and comprises transmitting a request message to the second base station, for requesting a cell addition for the communication device; receiving a response message comprising system information of a cell of the second base station from the second base station in response to the request message; and transmitting a first radio resource control (RRC) message comprising the system information to the communication device, after receiving the response message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
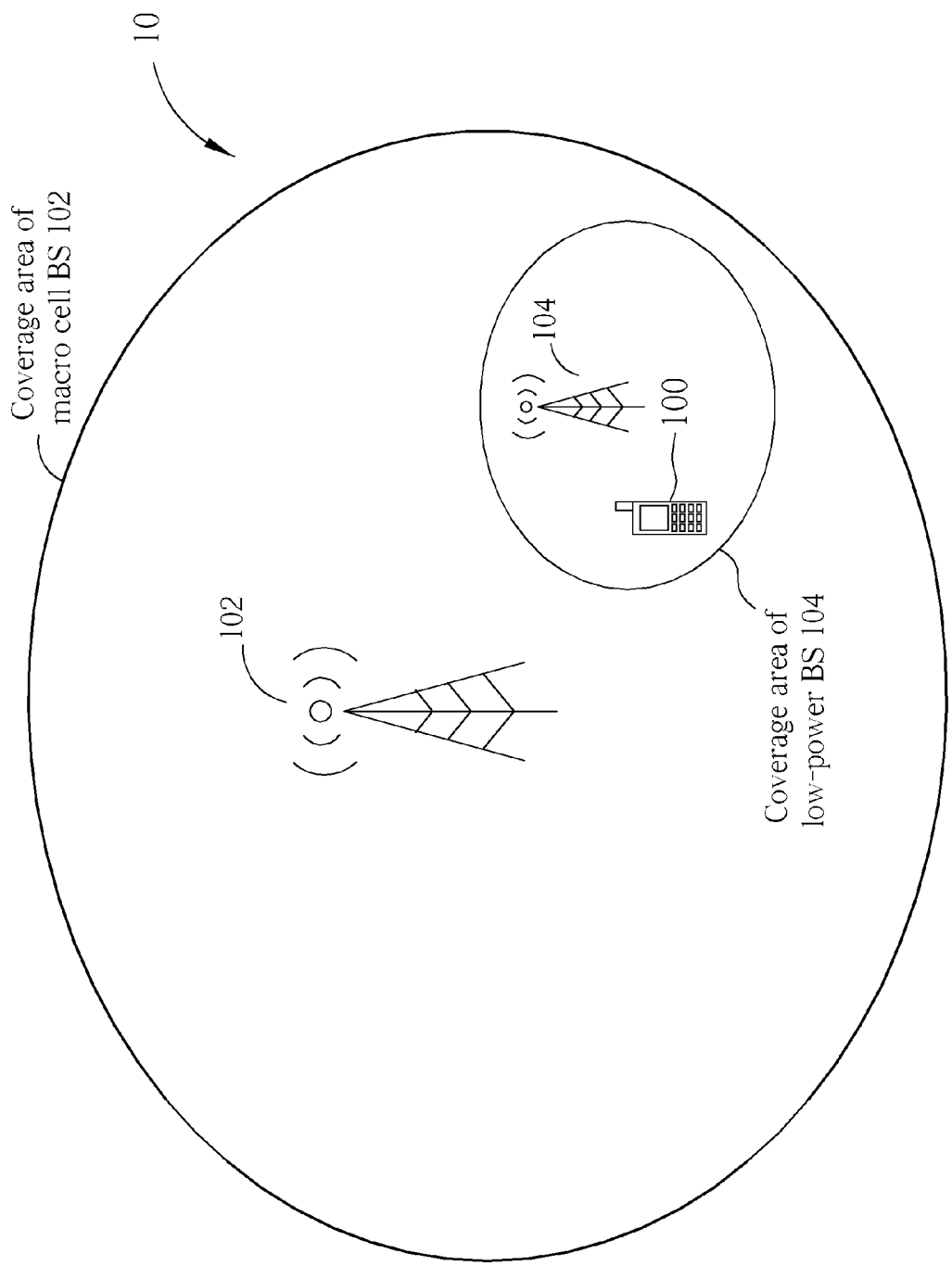
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100, a macro cell base station (BS) 102, and a low-power BS 104. In FIG. 1, the UE 100, the macro cell BS 102 and the low-power BS 104 and are simply utilized for illustrating the structure of the wireless communication system 10. Practically, the macro cell BS 102 and/or the low-power BS 104 may be an evolved NBs (eNB) and/or a relay station in an evolved UTRAN (E-UTRAN), a long term evolution (LTE) system, a LTE-Advanced (LTE-A) system or an evolution of the LTE-A system. In addition, the low-power BS 104 may be a pico cell BS or a femto cell BS. In FIG. 1, the low-power BS 104 is in a coverage area of the macro cell BS 102. In another example, the low-power BS 104 may be outside the coverage area of the macro cell BS 102, but the coverage areas of the low-power BS 104 and the macro cell BS 102 may be partly overlapped.

As shown in FIG. 1, the UE 100 is in coverage areas of the macro cell BS 102 and the low-power BS 104. The UE 100 may communicate with the macro cell BS 102 and the low-power BS 104 at the same time. That is, the UE 100 may perform a transmission/reception via both a cell of the macro cell BS 102 and a cell of the low-power BS 104. The UE 100 may be a machine type communication (MTC) device, a mobile phone, a laptop, a tablet computer, an electronic book or a portable computer system. In addition, the macro cell BS 102, the low-power BS 104 or the UE 100 may be seen as a transmitter or a receiver according to its transmission direction, e.g., for an uplink (UL), the UE 100 is the transmitter and the macro cell BS 102 and/or the low-power BS 104 is the receiver, and for a downlink (DL), the macro cell BS 102 and/or the low-power BS 104 is the transmitter and the UE 100 is the receiver.

Figure 2:
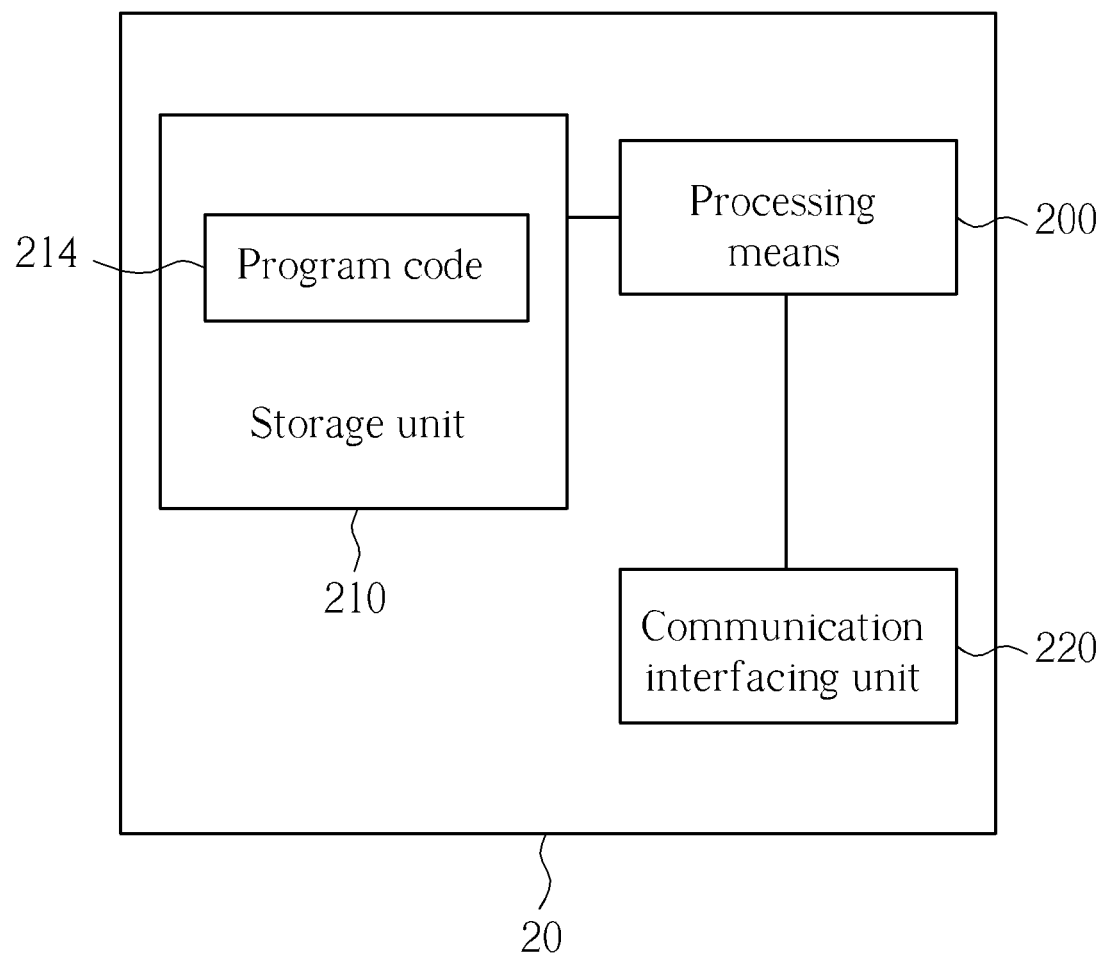
FIG. 2 is a schematic diagram of a communication device according to an example of the present invention.

Please refer to FIG. 2, which is a schematic diagram of a communication device 20 according to an example of the present invention. The communication device 20 may the macro cell BS 102 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., data, signals, messages and/or packets) according to processing results of the processing means 200.

Figure 3:
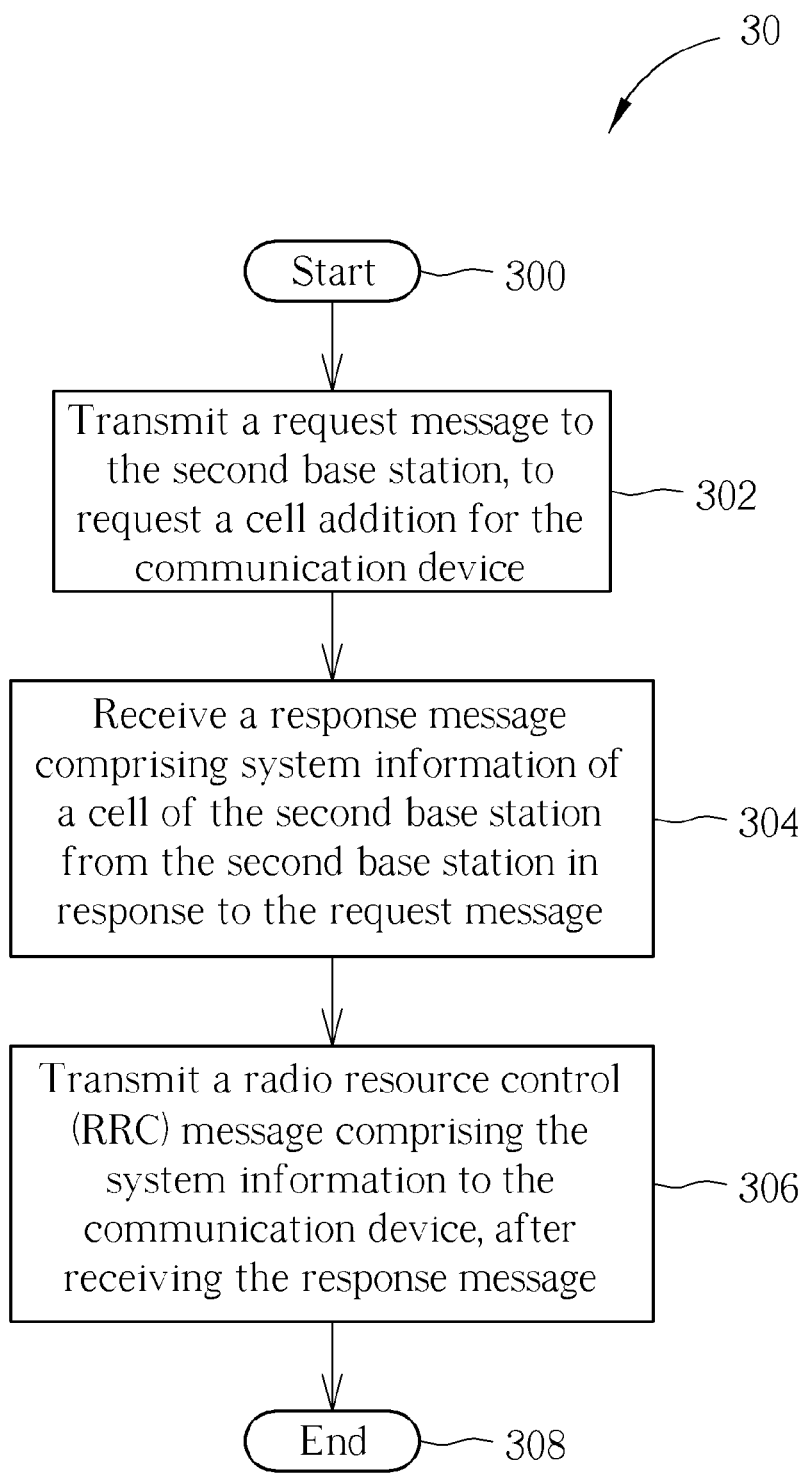
FIG. 3 is a flowchart of a process according to an example of the present invention.

FIG. 3 is a flowchart of a process 30 according to an example of the present invention. The process 30 may be utilized in a first base station (e.g., the macro cell BS 102) shown in FIG. 2, for handling a cell addition for a communication device (e.g., the UE 100) and a second base station (e.g., the low-power BS 104), to realize dual connectivity, where the communication device has connected to the first base station, e.g., via a cell of the first base station. The process 30 may be compiled into the program code 314 and includes the following steps:

Step 300: Start.

Step 302: Transmit a request message to the second base station, to request a cell addition for the communication device.

Step 304: Receive a response message comprising system information of a cell of the second base station from the second base station in response to the request message.

Step 306: Transmit a radio resource control (RRC) message comprising the system information to the communication device, after receiving the response message.

Step 308: End.

First note that, the process 30 is performed in the condition that the UE 100 has been communicated with a cell of the macro cell BS 102 and the macro cell BS 102 intends to provide another cell which is under the low-power BS 104 to the UE 100, to realize dual connectivity. According to the process 30, the macro cell BS 102 transmits a request message to the low-power BS 104, to request a cell addition for the UE 100. Then, the macro cell BS 102 receives a response message comprising system information of a cell of the low-power BS 104 from the low-power BS 104 in response to the request message. The macro cell BS 102 transmits a RRC message comprising the system information to the UE 100, after receiving the response message. In this situation, the low-power BS 104 provides the system information of the cell to the macro cell BS 102, after receiving the request message for the cell addition. The system information is included in the RRC message, and the RRC message is transmitted to the UE 100. Accordingly, the UE 100 may communicate with the cell of the low-power BS 104 according to the system information. Then, the UE 100 may operate regularly according to the system information provided by the low-power BS 104. That is, the UE 100 may communicate with the macro cell BS 102 and the low-power BS 104 simultaneously, to realize dual connectivity (i.e., inter-BS carrier aggregation) according to the above description. As a result, throughput of the UE 100 is improved due to simultaneous communications with both the macro cell BS 102 and the low-power BS 104.

Realization of the present invention is not limited to the above description.

In one example of the process 30, the RRC message sent to UE 100 may be generated by the macro cell BS 102. In another example, the macro cell BS 102 may receive a RRC message comprising system information generated by the low-power BS 104, included in the response message, and the macro cell BS 102 then forwards the RRC message to the UE 100. Furthermore, the macro cell BS 102 may receive a RRC response message from the UE 100 in response to the RRC message. That is, the UE 100 may acknowledge the reception of the RRC message (including the system information), after receiving the RRC message. Then, the macro cell BS 102 may transmit a cell addition confirm to the low-power BS 104, to confirm the cell addition, e.g., to notify the low-power BS 104 that the UE 100 has been acknowledged the cell addition.

Detail of the system information mentioned in the process 30 is not limited herein. For example, the system information may include a UL configuration of the cell of the low-power BS 104 and/or a DL configuration of the cell of the low-power BS 104. That is, the UL configuration and/or the DL configuration to be configured to the UE 100 may be included in the system information. In one example, the UL configuration may include a UL carrier frequency, a UL bandwidth, additional spectrum emission, a parameter p-Max, a UL power control, a sounding UL reference signal (RS) configuration, a UL cyclic prefix length, a physical random access channel (PRACH) configuration, a physical UL shared channel (PUSCH) configuration, a random access channel (RACH) configuration and/or a time-division duplexing (TDD) configuration. In another example, the DL configuration may include a DL bandwidth, antenna information, a multicast-broadcast single-frequency network (MBSFN) subframe configuration, a physical HARQ indicator channel (PHICH) configuration, a physical DL shared channel (PDSCH) configuration and a TDD configuration. Thus, the UE 100 may communicate with the cell of the low-power BS 104 regularly according to the system information.

It is possible that a configuration (e.g., which controls maximum transmission power) of the cell (which is added by the process 30) of the low-power BS 104 is changed (i.e., updated). The low-power BS 104 may need to update the original system information of the cell to new system information. The macro cell BS 102 may receive the new system information of the cell from the low-power BS 104, when the system information is updated to the new system information. In this situation, the macro cell BS 102 may transmit a RRC message including the new system information to the UE 100. Accordingly, the UE 100 may communicate with the cell of the low-power BS 104 according to the new system information. Alternatively, when in the same situation that low-power BS 104 updates the original system information of the cell to new system information, the macro cell BS 102 may transmit a RRC message to remove the cell from the configuration of the UE 100 instead of providing the new system information to the UE 100. It may be difficult for the UE 100 to update a configuration of the cell according to the new system information in certain situations, e.g., when timing for applying the new system information cannot be synchronized between the UE 100 and the low-power BS 104 is not perfect. Thus, a simple solution to solve the change of the configuration of the cell may be simply removing the cell and adding the cell again by using the process 30 and the previous description.

The macro cell BS 102 may further receive a first cell radio network temporary identifier (C-RNTI) of the cell of the low-power BS 104, after transmitting the request message for cell addition to the low-power BS 104 according to the process 30. Then, the macro cell BS 102 forwards the first C-RNTI of the cell of the low-power BS 104 to the UE 100. That is, according to the present invention, the first C-RNTI of the cell of the low-power BS 104 is determined by the low-power BS 104, and is transmitted to the macro cell BS 102. Thus, the low-power BS 104 communicates with the UE 100 according to (e.g., by using) the first C-RNTI, and the macro cell BS 102 communicates with the UE 100 according to (e.g., by using) a second C-RNTI of the macro cell BS 102. The second C-RNTI may be determined by the macro cell BS 102, and be transmitted to the UE 100 before the macro cell BS 102 transmits the request message for cell addition to the low-power BS 104. The low-power BS 104 may dynamically allocate DL resources and/or UL resources to the UE 100 according to the first C-RNTI on a Physical Downlink Control Channel (PDCCH) or on an Enhanced PDCCH (EPDCCH) via the cell of the low-power BS 104. The macro cell BS 102 may dynamically allocate DL resources and/or UL resources to the UE 100 according to the second C-RNTI on a PDCCH or on an EPDCCH via the cell of the macro cell BS 102. In other words, the UE should monitor the PDCCH or the EPDCCH transmitted by the low-power BS 104 according to the first C-RNTI, and monitor the PDCCH or the EPDCCH transmitted by the macro cell BS 102 according to the second C-RNTI.

In general, the UE 100 needs to perform a random access procedure before the UE 100 starts to communicate with a cell, e.g., the cell of the low-power BS 104, after the UE 100 receives the RRC message for adding the cell of the low-power BS 104. According to the present invention, the macro cell BS 102 may receive information of a random access preamble for the cell of the low-power BS 104 from the low-power BS 104, after transmitting the request message for cell addition to the low-power BS 104. Then, the macro cell BS 102 transmits the information of the random access preamble to the UE 100. That is, the information of the random access preamble is determined by the low-power BS 104, and is forwarded to the UE 100 via the aid of the macro cell BS 102. Then, the UE 100 may transmit the random access preamble via the resource to the cell of the low-power BS 104 to perform the random access procedure.

Different from the above-mentioned transmitting the random access preamble to the UE 100 via the macro cell BS 102, in another example, the low-power BS 104 may broadcast the information of the random access preamble, including an assignment of at least one of the random access preamble and a resource (e.g., time and/or frequency) for UE 100 transmitting the random access preamble, such that the UE 100 may receive the assignment of random access preamble in the added cell. The assignment of the random access preamble may indicate only one random access preamble, such that the UE 100 may transmit the random access preamble via the resource to the cell of the low-power BS 104 to perform the random access procedure. In another example, the assignment of the random access preamble may indicate a plurality of random access preambles. The UE 100 needs to select a random access preamble from the random access preambles first, and then performs the random access procedure by using the random access preamble.

Figure 4:
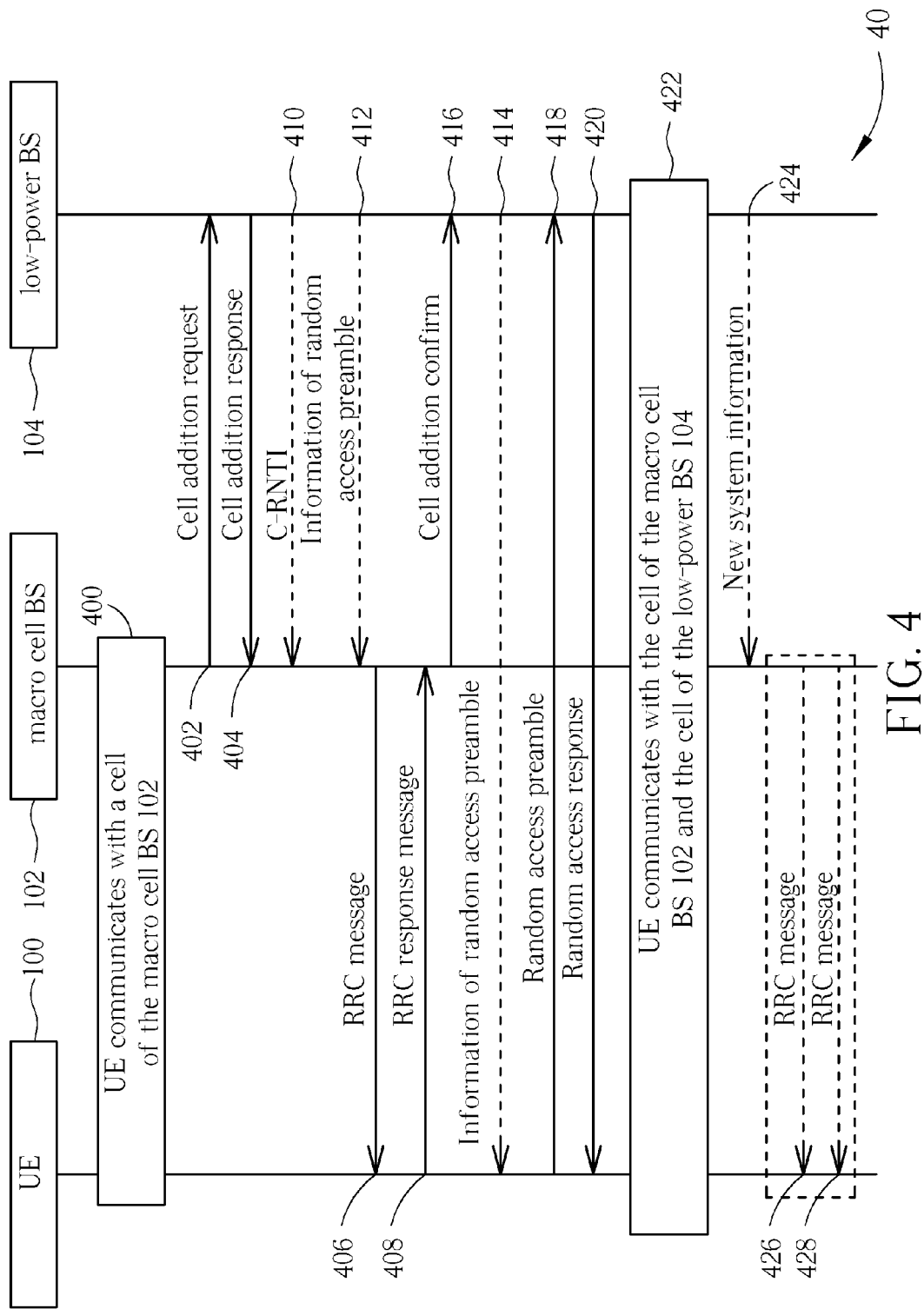
FIG. 4 is a flowchart of a process according to an example of the present invention.

FIG. 4 is a flowchart of a process 40 according to an example of the present invention. The process 40 is an example for illustrating the above description, including the process 30 and further examples. As shown in FIG. 4, the UE 100 has been communicated with a cell of the macro cell BS 102 (step 400). The macro cell BS 102 intends to realize dual connectivity (i.e., inter-BS carrier aggregation) for the UE 100, to improve throughput of the UE 100. The macro cell BS 102 transmits a cell addition request to the low-power BS 104, to request a cell addition for the UE 100 (step 402). The low-power BS 104 transmits a cell addition response including system information of a cell of the low-power BS 104 to the macro cell BS 102, to respond to the cell addition request (step 404). Then, the macro cell BS 102 transmits a RRC message including the system information to the UE 100 after receiving the cell addition response (step 406). The UE 100 transmits a RRC response message to acknowledge the reception of the RRC message including the system information (step 408).

It should be noted that a C-RNTI of the cell of the low-power BS 104 may be included in the cell addition response (step 404). In another example, the C-RNTI may be transmitted to the macro cell BS 102 via another message (step 410). In either case, the C-RNTI may be included in the RRC message (step 406) by the macro cell BS 102, to provide the C-RNTI to the UE 100.

Similarly, information of a random access preamble for the cell of the low-power BS 104 may be included in the cell addition response (step 404), or may be transmitted to the macro cell BS 102 via another message (step 412). In one example, the information of the random access preamble may be included in the RRC message (step 406) by the macro cell BS 102, to provide the information to the UE 100. In another example, the information of the random access preamble may be broadcasted by the low-power BS 104 on associated channel of the cell, e.g., a broadcast channel, a paging channel, a PDCCH or an EPDCCH (step 414). The low-power BS 104 may broadcast the information of the random access preamble after the low-power BS 104 receives a cell addition confirm message (step 416) sent by the macro cell BS 102 for confirming the cell addition. Whatever the low-power BS 104 broadcasts or transmits the information of the random access preamble via the macro cell BS 102, the UE 100 may receive the information of the random access preamble in the cell of the low-power BS 104.

The UE 100 may transmit a random access preamble according to the information of the random access preamble to the cell of the low-power BS 104, to perform a random access procedure (step 418). Accordingly, the UE 100 may receive a random access response including a random access preamble identity, a temporary C-RNTI, an uplink grant and a timing advance command from the cell of the low-power BS 104 (step 420). The UE 100 may start to communicate with the cells of the macro cell BS 102 and the low-power BS 104, if the random access procedure is performed successfully (step 422).

It should be noted that the UE 100 may determine whether the random access procedure is performed successfully or not according to a type of the random access procedure (e.g., contention-based or contention-free) which may be indicated by the information of random access preamble.

In one example, the UE 100 may receive the information of random access preamble via the broadcast channel or the paging channel, and in this situation, the UE 100 transmits a Medium Access Control (MAC) protocol data unit (PDU) including the C-RNTI of the cell of the low-power BS 104, to the low-power BS 104, by using the uplink grant included in a random access response sent from low-power BS 104 for contention resolution. Later, after the UE receives an UL grant or a DL assignment addressed by the C-RNTI of the cell of the low-power BS 104 on a PDCCH or an EPDCCH via the cell the low-power BS 104, the UE 100 determines that the random access procedure is performed successfully.

In another example, the UE 100 may receive the information of random access preamble via the PDCCH or the EPDCCH, and in this situation, the UE 100 determines that the random access procedure is performed successfully after the UE receives the random access response including a random access preamble identity identifying the random access preamble transmitted in step 418.

As stated previously, a configuration (e.g., transmission power) of the cell of the low-power BS 104 may be changed. The low-power BS 104 may transmit new system information of the cell to the macro cell BS 102 to update the original system information (step 424). The macro cell BS 102 may transmit a RRC message including the new system information to the UE 100 (step 426), such that the UE 100 may communicate with the cell of the low-power BS 104 according to the new system information. Alternatively, the macro cell BS 102 may transmit a RRC message to remove the cell of the low-power BS 104 from the configuration of the UE 100 instead of providing the new system information to the UE 100 (step 428). It should be noted that the update of the system information may occur in various time instants, and is not limited to the illustration (i.e., steps 424-428) shown in FIG. 4.

Those skilled in the art can easily obtain variants of the process 40 according to the previous description, and is not narrated herein.

The abovementioned steps of the processes including suggested steps may be realized by means that could be a hardware, a firmware known as a combination of a hardware device and computer instructions and data that reside as read-only software on the hardware device, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

To sum up, the present invention provides a method for handling a cell addition for dual connectivity. A communication device which has been communicating with a macro cell BS may communicate with a low-power BS regularly according to system information provided by the low-power BS. As a result, throughput of the communication device is improved due to simultaneous communications with both the macro cell BS and the low-power BS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a cell addition for dual connectivity in a communication system comprising a communication device, a first base station and a second base station, the communication device being connected to the first base station, the method being utilized in the first base station and comprising:

the first base station transmitting a request message to the second base station, for requesting a cell addition for the communication device;

the first base station receiving a response message comprising system information of a cell of the second base station from the second base station in response to the request message;

the first base station transmitting a first radio resource control (RRC) message comprising the system information to the communication device, after receiving the response message;

the first base station receiving a RRC response message from the communication device in response to the first RRC message; and the first base station transmitting a confirm message to the second base station to confirm the cell addition, after receiving the RRC response message from the communication device;

wherein the system information comprises at least one of an uplink configuration of the cell of the second base station and a downlink configuration of the cell of the second base station;

wherein the uplink configuration comprises at least one of an uplink carrier frequency, an uplink bandwidth, additional spectrum emission, a parameter p-Max, an uplink power control, a sounding uplink reference signal (RS) configuration, an uplink cyclic prefix length, a physical random access channel (PRACH) configuration, a physical uplink shared channel (PUSCH) configuration, a random access channel (RACH) configuration and a time-division duplexing (TDD) configuration.

2. The method of claim 1, wherein the step of transmitting the first RRC message comprising the system information to the communication device comprises:

receiving the first RRC message generated by the second base station included in the response message; and forwarding the first RRC message to the communication device.

3. The method of claim 1, wherein the downlink configuration comprises at least one of a downlink bandwidth, antenna information, a multicast-broadcast single-frequency network (MBSFN) subframe configuration, a physical HARQ indicator channel (PHICH) configuration, a physical downlink shared channel (PDSCH) configuration and a TDD configuration.

4. The method of claim 1, further comprising:

receiving new system information of the cell from the second base station, when the system information is updated to the new system information.

5. The method of claim 4, further comprising:

transmitting a second RRC message comprising the new system information to the communication device.

6. The method of claim 4, further comprising:

transmitting a second RRC message to the communication device, to remove the cell from the configuration of the communication device.

7. The method of claim 1, further comprising:

receiving a cell radio network temporary identifier (C-RNTI) of the cell from the second base station, after transmitting the request message to the second base station; and transmitting the C-RNTI of the cell to the communication device.

8. The method of claim 1, further comprising:

receiving information of a random access preamble for the cell from the second base station, after transmitting the request message to the second base station; and transmitting the information of the random access preamble to the communication device.

9. The method of claim 8, wherein the information of the random access preamble comprises at least one of an assignment of the random access preamble and a resource for transmitting the random access preamble.

10. A first base station for handling a cell addition for dual connectivity in a communication system comprising a communication device, the first base station and a second base station, the communication device being connected to the first base station, the first base station comprising:
   a storage unit for storing instructions of:
      transmitting a request message to the second base station, for requesting a cell addition for the communication device;
      receiving a response message comprising system information of a cell of the second base station from the second base station in response to the request message;
      transmitting a first radio resource control (RRC) message comprising the system information to the communication device, after receiving the response message;
      receiving a RRC response message from the communication device in response to the first RRC message;
      transmitting a confirm message to the second base station to confirm the cell addition, after receiving the RRC response message from the communication device; and
   a processing means, coupled to the storage unit, configured to execute the instructions stored in the storage unit;
   wherein the system information comprises at least one of an uplink configuration of the cell of the second base station and a downlink configuration of the cell of the second base station;
   wherein the uplink configuration comprises at least one of an uplink carrier frequency, an uplink bandwidth, additional spectrum emission, a parameter p-Max, an uplink power control, a sounding uplink reference signal (RS) configuration, an uplink cyclic prefix length, a physical random access channel (PRACH) configuration, a physical uplink shared channel (PUSCH) configuration, a random access channel (RACH) configuration and a time-division duplexing (TDD) configuration.

11. The first base station of claim 10, wherein the instruction of transmitting the first RRC message comprising the system information to the communication device comprises:
   receiving the first RRC message generated by the second base station included in the response message; and
   forwarding the first RRC message to the communication device.

12. The first base station of claim 10, wherein the downlink configuration comprises at least one of a downlink bandwidth, antenna information, a multicast-broadcast single-frequency network (MBSFN) subframe configuration, a physical HARQ indicator channel (PHICH) configuration, a physical downlink shared channel (PDSCH) configuration and a TDD configuration.

13. The first base station of claim 10, wherein the storage unit further stores the instruction of:
   receiving new system information of the cell from the second base station, when the system information is updated to the new system information.

14. The first base station of claim 13, wherein the storage unit further stores the instruction of:
   transmitting a second RRC message comprising the new system information to the communication device.

15. The first base station of claim 13, wherein the storage unit further stores the instruction of:
   transmitting a second RRC message to the communication device, to remove the cell from the configuration of the communication device.

16. The first base station of claim 10, wherein the storage unit further stores the instruction of:
   receiving a cell radio network temporary identifier (C-RNTI) of the cell from the second base station, after transmitting the request message to the second base station; and
   transmitting the C-RNTI of the cell to the communication device.

17. The first base station of claim 10, wherein the storage unit further stores the instruction of:
   receiving information of a random access preamble for the cell from the second base station, after transmitting the request message to the second base station; and
   transmitting the information of the random access preamble to the communication device.

18. The first base station of claim 17, wherein the information of the random access preamble comprises at least one of an assignment of the random access preamble and a resource for transmitting the random access preamble.

* * * * *